US008345317B2

(12) United States Patent
Makino et al.

(10) Patent No.: US 8,345,317 B2
(45) Date of Patent: Jan. 1, 2013

(54) COPYING APPARATUS

(75) Inventors: Masahiro Makino, Toride (JP); Tadashi Fukuda, Toride (JP); Sumito Tanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 579 days.

(21) Appl. No.: 12/582,571

(22) Filed: Oct. 20, 2009

(65) Prior Publication Data

US 2010/0097666 A1 Apr. 22, 2010

(30) Foreign Application Priority Data

Oct. 22, 2008 (JP) ................................ 2008-272130

(51) Int. Cl.
*H04N 1/04* (2006.01)

(52) U.S. Cl. ....... 358/3.28; 358/1.15; 358/475; 358/474

(58) Field of Classification Search ................ 358/3.28, 358/1.15, 475, 474
See application file for complete search history.

(56) References Cited

U.S. PATENT DOCUMENTS

| | | | | |
|---|---|---|---|---|
| 2004/0071364 | A1* | 4/2004 | Yamazaki et al. | 382/276 |
| 2005/0018845 | A1* | 1/2005 | Suzaki | 380/243 |
| 2006/0209349 | A1* | 9/2006 | Tabata | 358/3.28 |

FOREIGN PATENT DOCUMENTS

| | | | |
|---|---|---|---|
| JP | 5-265287 | A | 10/1993 |
| JP | 2002-207334 | A | 7/2002 |
| JP | 2006-261820 | A | 9/2006 |
| JP | 2007-034040 | A | 2/2007 |
| JP | 2007-034040 | A | 2/2007 |
| JP | 2007-047403 | A | 2/2007 |
| JP | 2007-133142 | A | 5/2007 |

* cited by examiner

*Primary Examiner* — Houshang Safaipour

(74) *Attorney, Agent, or Firm* — Canon USA, Inc., I.P. Division

(57) ABSTRACT

A copying apparatus detects a non glossy portion (K, M, C, or Y) and a glossy portion (T) of a document based on image data output from a reader unit. The copying apparatus forms an image of the detected non glossy portion (K, M, C, or Y) with a colored toner and an image of the detected glossy portion (T) with a transparent toner, on a sheet, based on the image data output from the reader unit.

5 Claims, 22 Drawing Sheets

COPYING APPARATUS

BACKGROUND OF THE INVENTION

1. Field of the Invention

The present invention relates to a copying apparatus that can form an image with a transparent toner.

2. Description of the Related Art

An electrophotographic copying apparatus can use a transparent toner to form a glossy image. An image formation technique discussed in Japanese Patent Application Laid-Open No. 5-265287 includes determining a non-text region of a document image having been read and forming an image of the detected non-text region with a transparent toner. Further, an image formation technique discussed in Japanese Patent Application Laid-Open No. 2007-034040 includes analyzing a document image having been read and forming an image of a photographic image region with a transparent toner without using the transparent toner for image formation of a presentation material region (e.g., graphs and drawings).

Further, an image formation technique discussed in Japanese Patent Application Laid-Open No. 2002-207334 includes determining a photo region based on a detection of the glossiness of a document and overlapping a transparent toner on the photo region. The technique discussed in Japanese Patent Application Laid-Open No. 2002-207334 includes a light emitting element that is capable of obliquely emitting light to irradiate the document with the emitted light and a light receiving element that is capable of receiving regular reflection light from the document. The light emitting element and the light receiving element are optical elements newly provided in addition to an image sensor that is capable of reading a document image.

The technique discussed in Japanese Patent Application Laid-Open No. 2002-207334 further includes comparing the quantity of light having been received by the light receiving element with a threshold and, if it is determined that the received quantity of light exceeds the threshold, identifying a detected region as a glossy region. However, in view of reducing the cost of the apparatus and reducing the size of the apparatus, the above-described conventional image formation technique is not desired because it requires both the light emitting element and the light receiving element that are newly provided for the purpose of detecting the glossiness of a document.

SUMMARY OF THE INVENTION

The present invention is directed to a copying apparatus capable of copying a glossy portion of a document as a glossy portion and copying a non glossy portion of the document as a non glossy portion at a low cost without increasing the size of the apparatus.

According to an aspect of the present invention, a copying apparatus includes a reading unit configured to read an image of a document, and an image forming unit configured to form, on a sheet, an image based on image data output from the reading unit. The image forming unit is configured to form an image on the sheet with a transparent toner based on a luminance value which is within a predetermined luminance value range which is lower than a luminance value of a background of the document, and form an image on the sheet with a colored toner based on a luminance value which is lower than the predetermined luminance value range.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
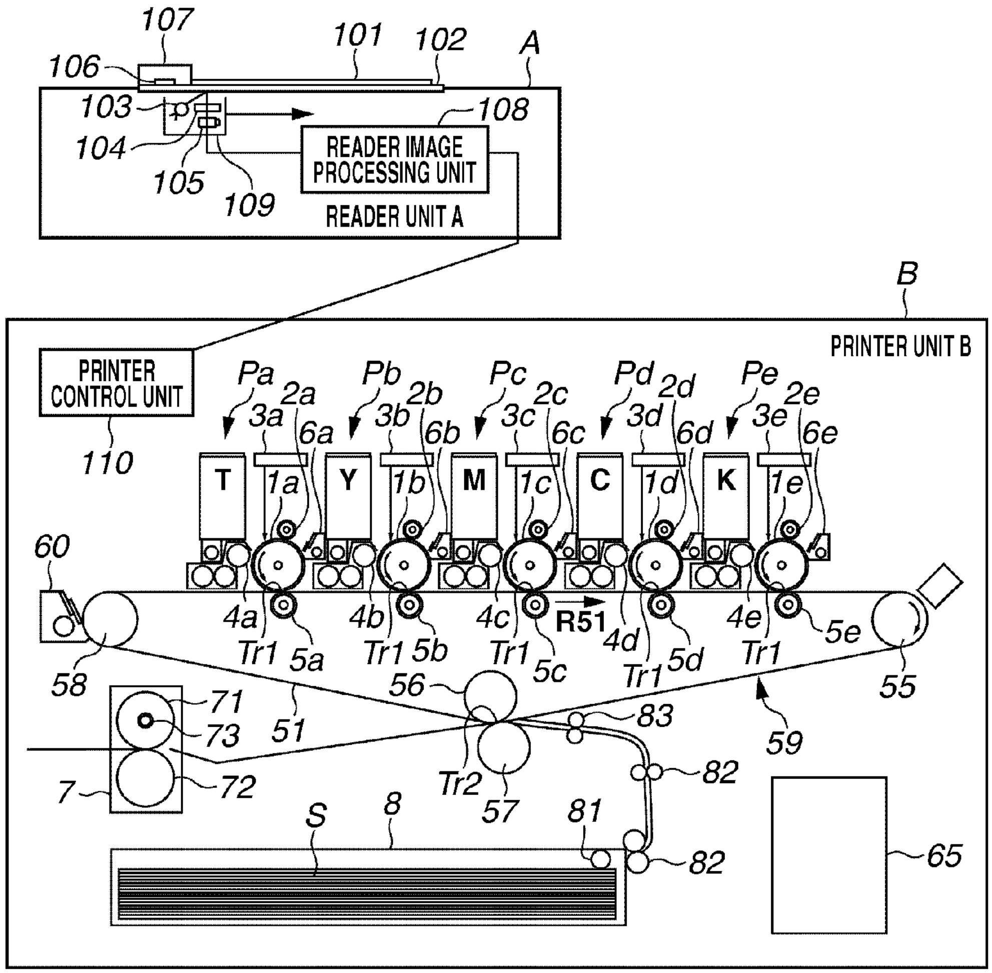
FIG. 1 illustrates an example of a configuration of an image forming apparatus according to an exemplary embodiment of the present invention.

FIG. 1 illustrates a configuration of an image forming apparatus according to an exemplary embodiment of the present invention. The image forming apparatus includes a reader unit A configured to read a document and a printer unit B configured to output an image of the document read by the reader unit A according to an electrophotographic method.

A light source 103 can illuminate a document 101 placed on a document positioning glass plate 102 of the reader unit A. Reflection light from the document 101 is guided by an optical system 104 and formed as an optical image on an image sensor (e.g., a CCD sensor) 105. The CCD sensor 105 includes CCD line sensors that are disposed in a predetermined pattern constituting three lines.

Respective CCD line sensors can generate color component signals of red (R), green (G), and blue (B). The light source 103, the optical system 104, and the CCD sensor 105 are integrated as a reading optical system unit 109. The reading optical system unit 109 can move in a direction indicated by an arrow illustrated in FIG. 1 to perform an operation for reading (i.e., scanning) the document 101 placed on the document positioning glass plate 102. The CCD sensor 105 can sequentially convert, for each line, a read (i.e., scanned) image of the document 101 into an electric signal (i.e., an image signal) and can output the converted electric signal (i.e., the image signal) of each line.

A reader image processing unit 108 can process image signals of respective lines, when the reader image processing unit 108 receives the image signals from the CCD sensor 105, and can transfer the processed signals to a printer control unit 110 of the printer unit B. A positioning member 107 is disposed next to the document positioning glass plate 102 and is located at an appropriate position where the positioning member 107 can abut against one side of the document 101 to prevent the document 101 from being placed obliquely.

A reference white color board 106 is disposed under the positioning member 107. The reference white color board 106 can be used to determine a white level of the CCD sensor 105. The reference white color board 106 can be also used for shading correction to be performed in a main scanning direction of the CCD sensor 105 (i.e., an image sensor arranging direction).

Figure 2:
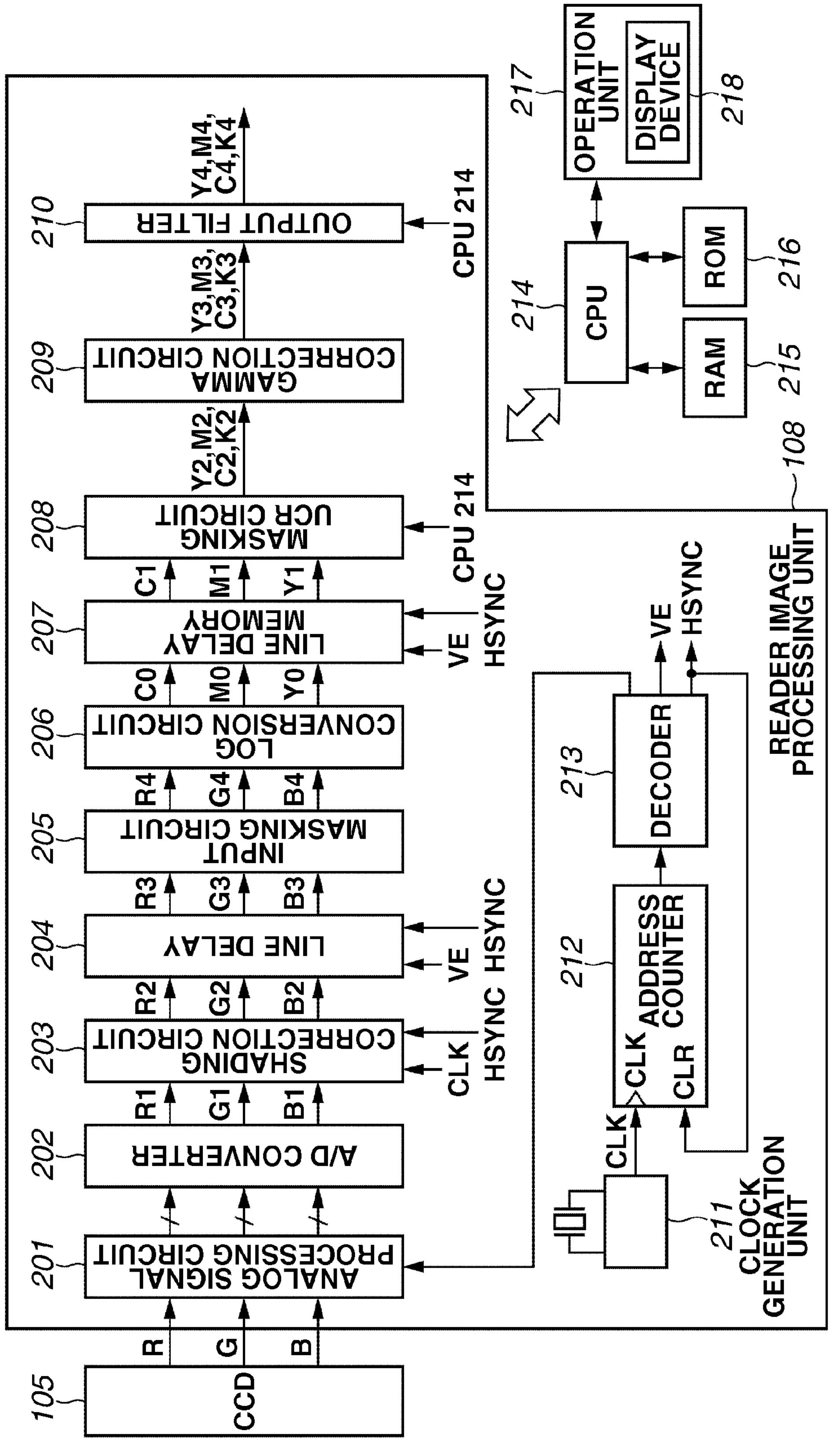
FIG. 2 is a block diagram illustrating an example of a reader image processing unit according to an exemplary embodiment of the present invention.

FIG. 2 is a block diagram illustrating a configuration of the reader image processing unit 108. An analog signal processing circuit 201 can perform gain and offset adjustment on image signals R, G, and B that are output from the CCD sensor 105. An analog-digital (A/D) converter 202 can convert the image signals R, G, and B having been processed by the analog signal processing circuit 201 into digital image signals R1, G1, and B1 (i.e., 8-bit R, G, and B color data).

A shading correction circuit 203 can perform shading correction on the image signals R1, G1, and B1 output from the A/D converter 202, referring to reading signals of respective color components based on the reference white color board 106. The shading correction circuit 203 can output image signals R2, G2, and B2 to a line delay 204.

A clock generation unit 211 can generate a clock CLK on a pixel-by-pixel basis. An address counter 212 can count the clock CLK and generate/output a main scanning address signal for each line. A decoder 213 can decode the main scanning address signal to a CCD drive signal (e.g., a shift pulse or a reset pulse) for each line, a signal VE that represents an effective area of the one-line image signal output from the CCD sensor 105, and a line sync signal HSYNC.

The address counter 212 can be cleared when it receives the line sync signal HSYNC and can start counting main scanning addresses in the next line. Respective line sensors, which cooperatively constitute the CCD sensor 105, are mutually spaced at predetermined intervals (i.e., predetermined distances) in a sub scanning direction (i.e., a direction perpendicular to the main scanning direction). In other words, respective line sensors are mutually deviated in a positional relationship.

The line delay 204 can correct a spatial deviation (i.e., a positional deviation) in the sub scanning direction of each line sensor. More specifically, in a case where the R, G, and B line sensors are arrayed in this order in the sub scanning direction and the image forming apparatus performs scanning on a document in this order, the line delay 204 delays the G signal by one line relative to the B signal and delays the R signal by two lines relative to the B signal in the sub scanning direction. Thus, the line delay 204 can output RGB signals R3, G3, and B3 that have been obtained (read) from the same line of the document.

An input masking circuit 205 can convert a color space of an image signal, which can be determined based on spectral characteristics of a color optical filter of each line sensor of the CCD sensor 105, into a predetermined color space (e.g., a standard color space such as sRGB or NTSC). The input masking circuit 205 can output image signals R4, G4, and B4 to a LOG conversion circuit 206.

The LOG conversion circuit 206 can convert the image signals (i.e., luminance signals) R4, G4, and B4 (i.e., three primary colors of light) received from the input masking circuit 205 into C0, M0, and Y0 density signals (i.e., three primary colors of color) referring to a lookup table. A line delay memory 207 can delay the C0, M0, and Y0 image signals and can output C1, M1, and Y1 signals to a masking UCR circuit 208.

The masking UCR circuit 208 can extract a black signal K from the received Y1, M1, and C1 (i.e., three primary colors) signals. The masking UCR circuit 208 can further sequentially output image signals Y2, M2, C2, and K2 each having a predetermined bit width (e.g., 8-bit). A gamma correction circuit 209 can perform density correction on the image signals Y2, M2, C2, and K2 to obtain signals Y3, M3, C3, and K3 that have ideal gradation characteristics suitable for the printer unit B. An output filter 210 can perform edge intensifying or smoothing processing on the image signals Y3, M3, C3, and K3 received from the gamma correction circuit 209 to output image signals M4, C4, Y4, and K4.

The frame sequential image signals M4, C4, Y4, and K4 are transferred to the printer control unit 110 of the printer unit B and converted into pulse width modulated pulse signals that can be used for image formation.

A central processing unit (CPU) 214 is associated with a random access memory (RAM) 215 that can function as a work memory. The CPU 214 can control the reader image processing unit 108 and various components in the reader unit A and perform image processing according to programs stored in a read only memory (ROM) 216. An operation unit 217 is a user interface, which can be provided in the reader unit A. The operation unit 217 allows an operator to input instructions and processing conditions to the CPU 214.

A display device 218 can display various operational states of the image forming apparatus including the reader unit A and the printer unit B. The display device 218 can further display processing conditions having been set for the image forming apparatus.

The printer unit B is described below in more detail. The printer unit B includes an intermediate transfer belt 51 that can function as an intermediate transfer member configured to perform image formation on a sheet. The printer unit B further includes first to fifth image forming stations Pa, Pb, Pc, Pd, and Pe that are configured to form toner images. The first to fifth image forming stations Pa, Pb, Pc, Pd, and Pe are disposed in this order along a rotational travelling direction of the intermediate transfer belt 51. In FIG. 1, an arrow R51 indicates the rotational travelling direction of the intermediate transfer belt 51.

The first to fifth image forming stations Pa to Pe can form color toner images of transparent (T), yellow (Y), magenta (M), cyan (C), and black (K), respectively. In the present exemplary embodiment, the transparent toner (T) becomes transparent when it is subjected to fixing processing by a fixing device 7 in a state where the transparent toner (T) is transferred on a sheet S. The image forming stations Pa to Pe include photosensitive drums 1*a* to 1*e* (i.e., rotary drum bodies each serving as an image carrier), respectively. Each photosensitive drum can be driven to rotate at a predetermined process speed (i.e., a predetermined circumferential speed).

The following devices to be used in image formation processes are disposed around respective photosensitive drums 1*a* to 1*e* from an upstream side to a downstream side along a rotational direction. The devices to be used in image formation processes and provided around respective photosensitive drums 1*a* to 1*e* include charging rollers 2*a* to 2*e*, exposure devices 3*a* to 3*e*, developing devices 4*a* to 4*e*, primary transfer rollers 5*a* to 5*e* (i.e., transfer members), and cleaning devices 6*a* to 6*e*, which are sequentially disposed from the upstream side to the downstream side.

As illustrated in FIG. 1, an intermediate transfer unit 59 is disposed under the photosensitive drums 1*a* to 1*e*. The intermediate transfer unit 59 includes the intermediate transfer belt 51, a driving roller 55, a driven roller 58, a secondary transfer counter roller 56, primary transfer rollers 5*a* to 5*e*, a secondary transfer roller 57, and a belt cleaner 60. The intermediate transfer belt 51 is stretched around the driving roller 55, the driven roller 58, and the secondary transfer counter roller 56. The intermediate transfer belt 51 is sandwiched between the secondary transfer roller 57 and the secondary transfer counter roller 56. A secondary transfer portion (i.e., a secondary transfer nip portion) Tr2 is formed between the secondary transfer roller 57 and the intermediate transfer belt 51.

The primary transfer rollers 5*a* to 5*e* can respectively apply a transfer bias to the color toner images formed on respective photosensitive drums 1*a* to 1*e*. The intermediate transfer belt 51 is sandwiched between the primary transfer rollers 5*a* to 5*e* and the photosensitive drums 1*a* to 1*e* at respective primary transfer portions Tr1. When the intermediate transfer belt 51 rotates in a direction indicated by the arrow R51, toner images of respective colors are sequentially transferred (i.e., primarily transferred) onto the intermediate transfer belt 51 and conveyed to the secondary transfer portion Tr2.

On the other hand, before the toner images carried on the intermediate transfer belt 51 reach the secondary transfer portion Tr2, a sheet feeding roller 81 starts feeding the uppermost sheet S (e.g., a recording paper) stored in a sheet feeding cassette 8 to a sheet conveyance path. Two or more pairs of conveyance rollers 82 convey the sheet S fed from the sheet feeding cassette 8 toward the secondary transfer portion Tr2. The conveyance rollers 82 are provided at appropriate clearances (or distances) along the sheet conveyance path.

A pair of registration rollers 83 can supply the sheet S into the secondary transfer portion Tr2 in synchronization with the toner images on the intermediate transfer belt 51. At the secondary transfer portion Tr2, a secondary transfer bias is applied between the secondary transfer roller 57 and the secondary transfer counter roller 56 to transfer (secondarily transfer) toner images from the intermediate transfer belt 51 onto a surface of the sheet S. In the present exemplary embodiment, the belt cleaner 60 can remove and collect secondary toner particles that have not been transferred to the sheet S and remain on the intermediate transfer belt 51.

The fixing device 7 includes a fixing roller 71 and a pressing roller 72. The fixing roller 71 can rotate around its rotational shaft. The pressing roller 72 is pressed against the fixing roller 71 and can rotate in accordance with the rotation of the fixing roller 71. A heater 73 is provided in the fixing roller 71. For example, the heater 73 is a halogen lamp. A voltage applied to the heater 73 can be controlled to adjust the surface temperature of the fixing roller 71. In such a warmed-up state, if the conveyed sheet S reaches the fixing device 7, the fixing roller 71 and the pressing roller 72 rotate at constant speeds in opposite directions.

While the sheet S passes through a clearance between the fixing roller 71 and the pressing roller 72, both the front and reverse surfaces of the sheet S are pressed at a predetermined pressure given by the fixing roller 71 and the pressing roller 72 and heated at a predetermined temperature. Thus, the fixing device 7 can fuse and fix the toner images on the surface of the sheet S to form a full-color image on the sheet S.

Further, in FIG. 1, the printer control unit 110 can control operations of the above-described functional units that respectively configure the image forming apparatus.

Next, an example of a sheet (i.e., an output product) that includes a non-high glossy image portion (i.e., a non glossy portion) and a high glossy image portion (i.e., a glossy portion) is described below. More specifically, the sheet according to the present exemplary embodiment is not a piece of sheet whose entire surface is highly glossy. The sheet according to the present exemplary embodiment is a piece of sheet that includes at least one non glossy portion (i.e., a first portion such as a background of the sheet) and at least one highly glossy portion (i.e., a second portion having glossiness higher than that of the first portion).

Differences in surface properties between the non-highly glossy portion and the highly glossy portion can be recognized as differences in visibility. Therefore, the output product can have enhanced additive values if images, patterns, and texts are expressed using highly glossy portions and non-highly glossy portions.

The highly glossy portion is a portion where a transparent toner image having a predetermined density is formed by the image forming station Pa. Therefore, the highly glossy portion has a highly smooth surface compared to a background portion of the sheet or a portion where other colored toner image is formed. The highly glossy portion is generally formed with a transparent toner. Other colored toners are not used to form the highly glossy portion. However, the highly glossy portion according to the present exemplary embodiment is not limited to the portion whose image is formed with a transparent toner and can be a glossy portion having been subjected to other surface processing or coating.

In the present exemplary embodiment, the "colored toner" includes a black toner and can be discriminated from the transparent toner. Further, a "colored image" includes a black color image and can be discriminated from a colorless high glossy image.

Figure 3:
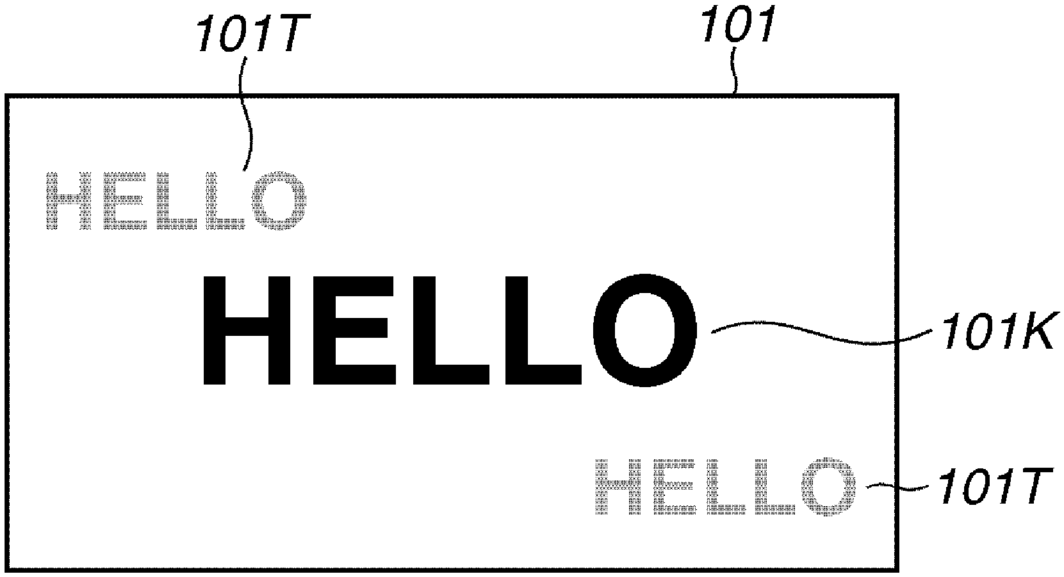
FIG. 3 illustrates an example of an output product including a highly glossy portion.
Figure 4A:
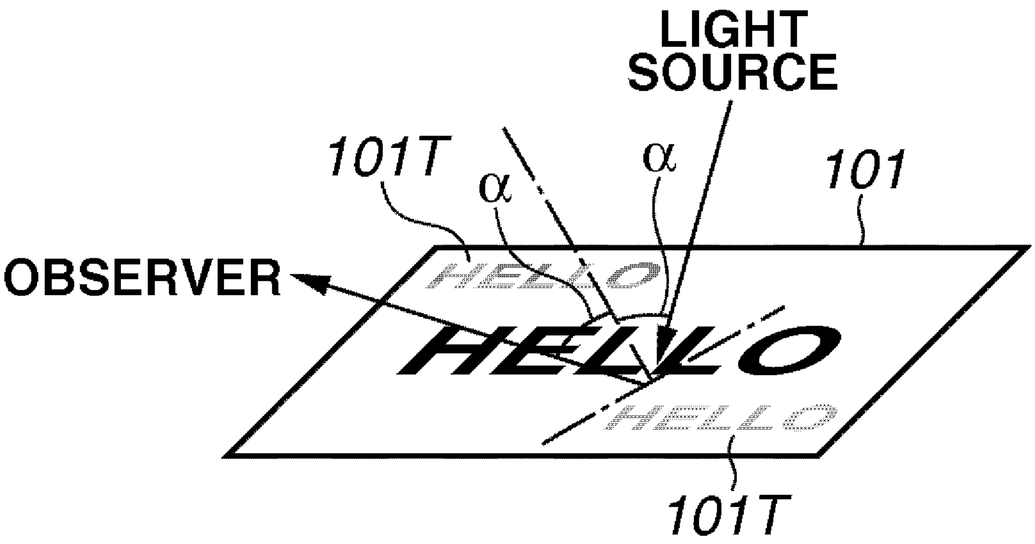
FIG. 4 illustrates an appearance of the output product including the highly glossy portion.

FIG. 3 illustrates an example of an output product that includes a highly glossy portion. More specifically, the output product illustrated in FIG. 3 is a sheet 101 on which a transparent toner image 101T and a black toner image 101K are formed. The transparent toner image 101T is a highly glossy portion and the rest is a non-highly glossy portion. As illustrated in FIG. 4A, in a case where the positional relationship between a light source and an observer is a positional relationship of regular reflection (i.e., when an incident angle α of light is equal to an output angle α of the light), the observer can clearly recognize the highly glossy portion 101T of the image.

Figure 4B:
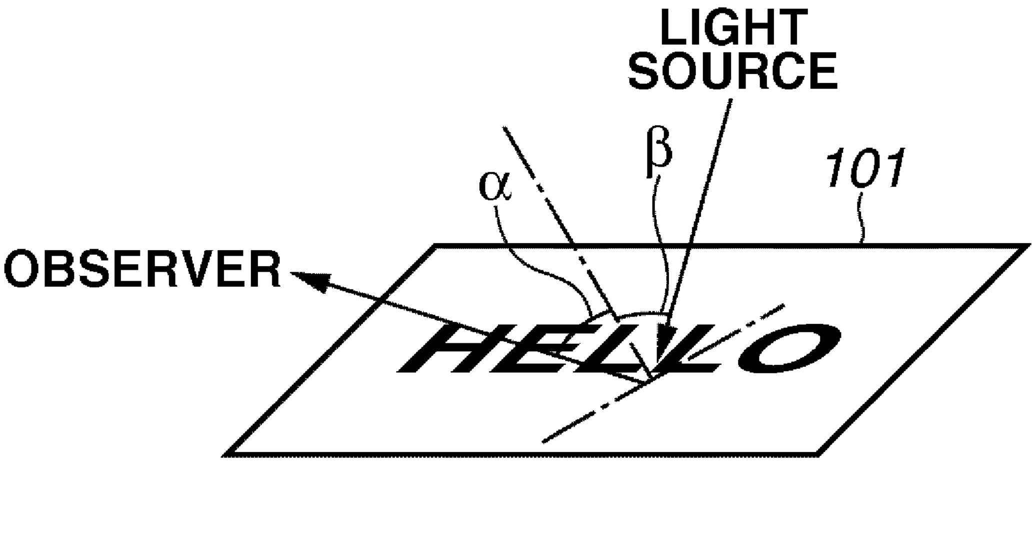

On the other hand, as illustrated in FIG. 4B, in a case where the positional relationship between the light source and the observer is not the positional relationship of regular reflection (i.e., when an incident angle β of light is different from an output angle α of the light), it is difficult for the observer to recognize the highly glossy portion 101T.

Figure 5:
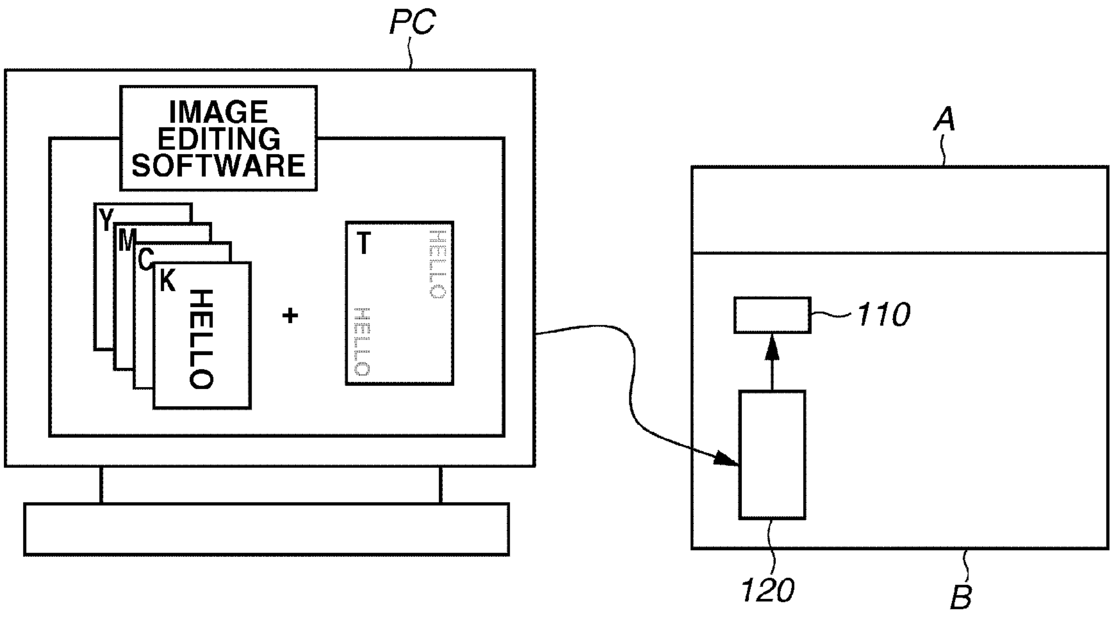
FIG. 5 illustrates an example of an image formation system for forming the output product including the highly glossy portion according to an exemplary embodiment of the present invention.

The output product including a highly glossy portion can be formed in the following manner. As illustrated in FIG. 5, the above-described printer unit B can be connected to a personal computer (PC) and can form, on the sheet S, an image edited by image editing software that a user can operate on the PC. The image editing software can be used to form a version (i.e., colored image data) of a colored image portion (RGB or YMCK) and a version (i.e., special color image data) of a high glossy image portion (T).

A printer driver installed on the PC can transmit the generated image data to a controller 120 of the printer B. The controller 120 stores the colored image data and the special color image data in a memory. The controller 120 converts the colored image data into YMCK toner data. The controller 120 determines whether the special color image data includes image information.

If it is determined that the special color image data does not include any image information, the controller 120 sets transparent toner data to 0%. If it is determined that the special color image data includes the image information, the controller 120 sets the transparent toner data to 70%.

In the present exemplary embodiment, the percentage of the toner data is regulated referring to fixing properties of the image forming apparatus. A maximum toner amount of each color is set to 100%. For example, the toner amount per unit area is set to 0.55 $mg/cm^2$. The reason why the transparent toner data is set to 70% is because adequate image quality can be obtained when the printer unit performs image formation if the total toner amount including the colored toner components is limited to an amount that can be processed in a transfer/fixing system.

Meanwhile, when the transparent toner data amount is set to approximately 70%, an effect of improving the visibility of the transparent toner portion can be obtained and a highly glossy portion can be expressed using the transparent toner. The controller 120 sends these toner data to the printer control unit 110. The printer control unit 110 controls the exposure devices 3*a* to 3*e* based on the T, Y, M, C, and K toner data. Therefore, the image forming apparatus can obtain the output product illustrated in FIG. 3.

Figure 6:
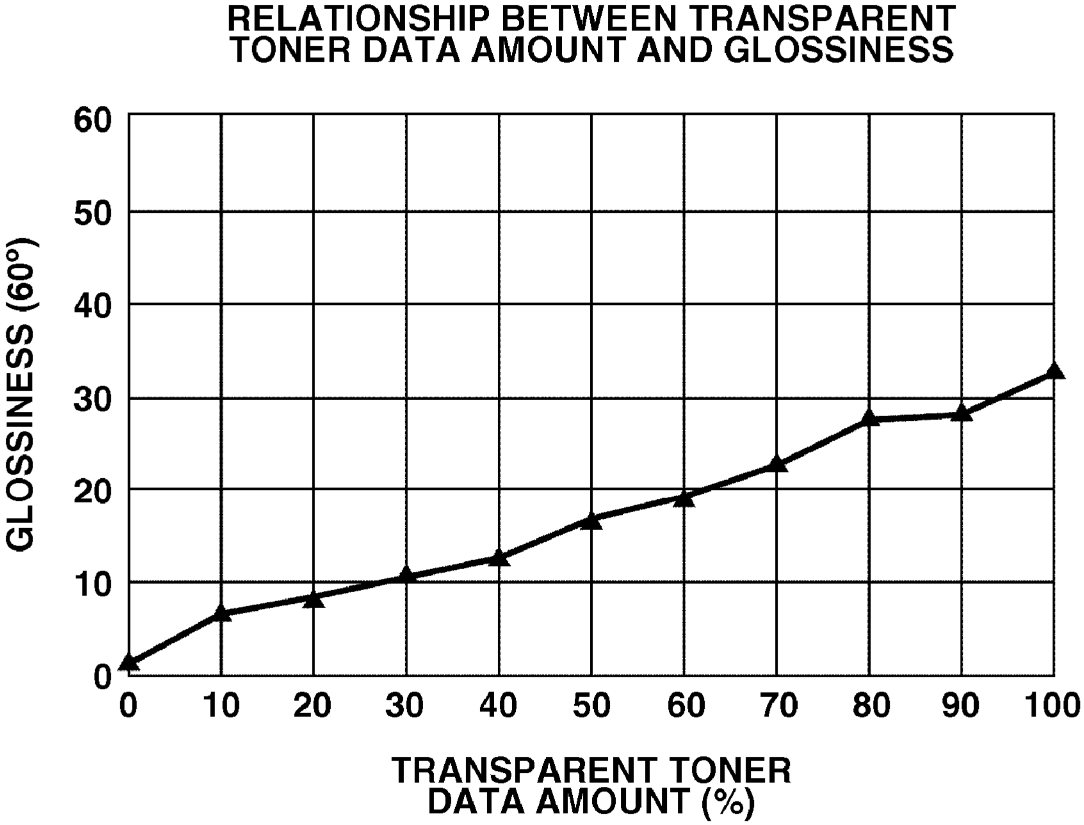
FIG. 6 is a graph illustrating an example of a relationship between the amount of a transparent toner and measured glossiness value (i.e., regular reflectance value).

An example of a relationship between transparent toner data amount and glossiness is described below. FIG. 6 is a graph illustrating an example of a relationship between the amount of a transparent toner formed on the sheet by the image forming apparatus according to the present exemplary embodiment and measured glossiness value (i.e., regular reflectance value). As apparent from FIG. 6, when the transparent toner data amount increases, the surface smoothness increases and a large glossiness value can be obtained. However, as described above, it is necessary to determine the transparent toner data amount considering the total toner amount.

A configuration that can be used to read the above-described output product as a document and recognize a highly glossy portion to reproduce the document including the highly glossy portion is described below. As illustrated in FIG. 1, a setup position of the CCD sensor 105 is not a position where the CCD sensor 105 can receive regular reflection light from the light source 103. Rather, the CCD sensor 105 is disposed at a position where the CCD sensor 105 can receive irregular reflection light from the document 101.

Figure 7:
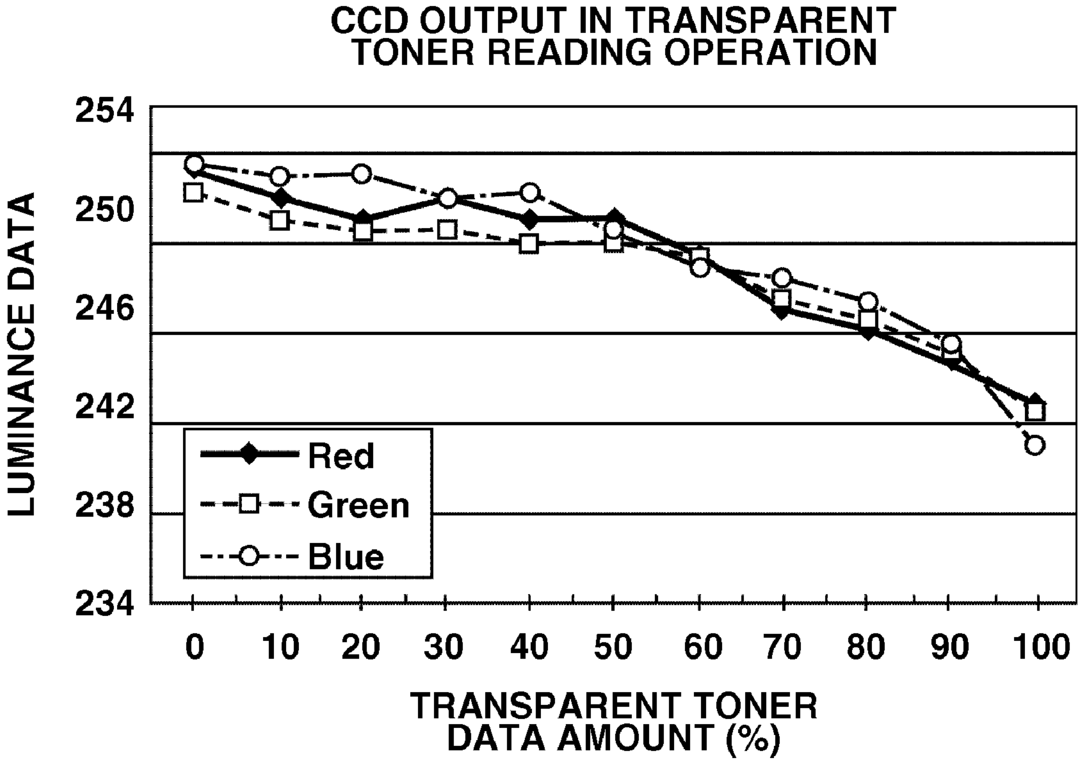
FIG. 7 a graph illustrating an example of a relationship between the data amount of each transparent toner formed on a white color sheet and luminance data detected by a charge coupled device (CCD) sensor.

FIG. 7 is a graph illustrating an example of a relationship between the data amount of each transparent toner formed on a white color sheet and luminance data detected by the CCD sensor 105. In this case, it is assumed that other colored toner images are not formed in a region where the transparent toner is formed. As apparent from FIG. 7, when the data amount of each transparent toner increases, the luminance data value becomes smaller. This is because, if the amount of the transparent toner accumulated on a sheet increases, the surface smoothness of the sheet can be improved. Accordingly, compared to a background portion of the document, a regular reflection light component becomes larger and an irregular reflection light component becomes smaller.

As described above, the regular reflection light component in the highly glossy portion (i.e., the second portion) is greater than that in the background portion (i.e., the first portion) of the document. In other words, the irregular reflection light component in the highly glossy portion (i.e., the second portion) is smaller than that in the background portion (i.e., the first portion) of the document. Therefore, it is useful to detect a high glossy image portion considering the above-described relationship.

A sheet that can be used to measure the above-described data is, for example, CLC SK/157g and a handy type gloss meter (PG-1M) provided by Nippon Denshoku Industries Co., LTD. can be used to measure the glossiness (in compliance with JIS Z8741 mirror surface glossiness-measurement method).

In a case where a sheet has a higher value in the level of whiteness, the irregular reflection light component from a background portion becomes larger. Therefore, as illustrated in FIG. 8, when the CCD sensor 105 reads a transparent toner on the sheet, the CCD sensor 105 produces an output value equal to or close to a maximum output level.

Figure 8:
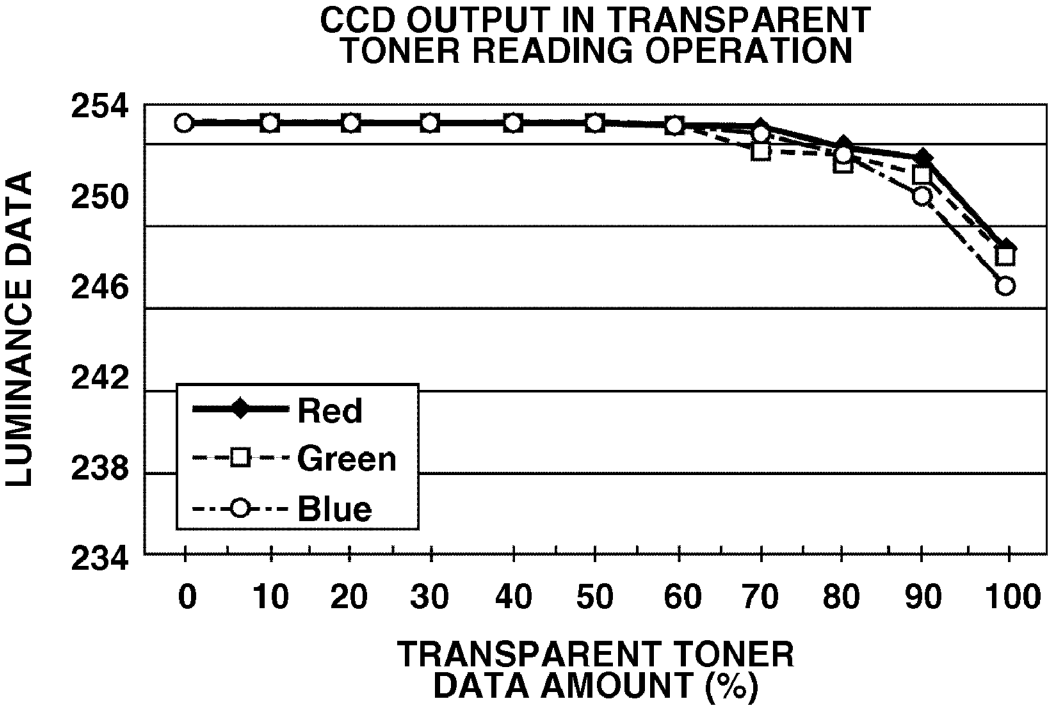
FIG. 8 is a graph illustrating an example of a relationship between the data amount of each transparent toner formed on a highly white color sheet and luminance data detected by the CCD sensor.

FIG. 8 is a graph illustrating an example of a relationship between the data amount of each transparent toner formed on HAMMERMILL® Color Copy Paper 105 $g/m^2$ provided by INTERNATIONAL PAPER COMPANY and luminance data detected by the CCD sensor. The ISO whiteness level (JIS P 8148) of the above-described sheet according to a diffuse illumination method is 98. As apparent from FIG. 8, if the transparent toner data amount is equal to or less than 90%, it is difficult to detect the highly glossy portion. On the other hand, if the transparent toner data amount is equal to 100%, the highly glossy portion can be detected.

However, as described above, in the formation of a high glossy image, it is desired to set the transparent toner data amount to be approximately 70% (not 100%). Therefore, the image forming apparatus is required to detect a transparent toner formed at the toner amount level of 70% on a sheet having a higher whiteness level.

In view of the foregoing, the present exemplary embodiment performs the following operations after completing a conventional document reading operation. First, the present exemplary embodiment reduces the quantity of light emitted from the light source.

Second, the present exemplary embodiment performs reading the document again under the reduced quantity of light. Finally, the present exemplary embodiment detects a highly glossy portion from the document based on the results obtained by the secondary reading operation. Thus, the present exemplary embodiment can detect any transparent toner even when a sheet on which the transparent toner is formed at the toner amount level of 70% has a higher whiteness level.

Figure 9:
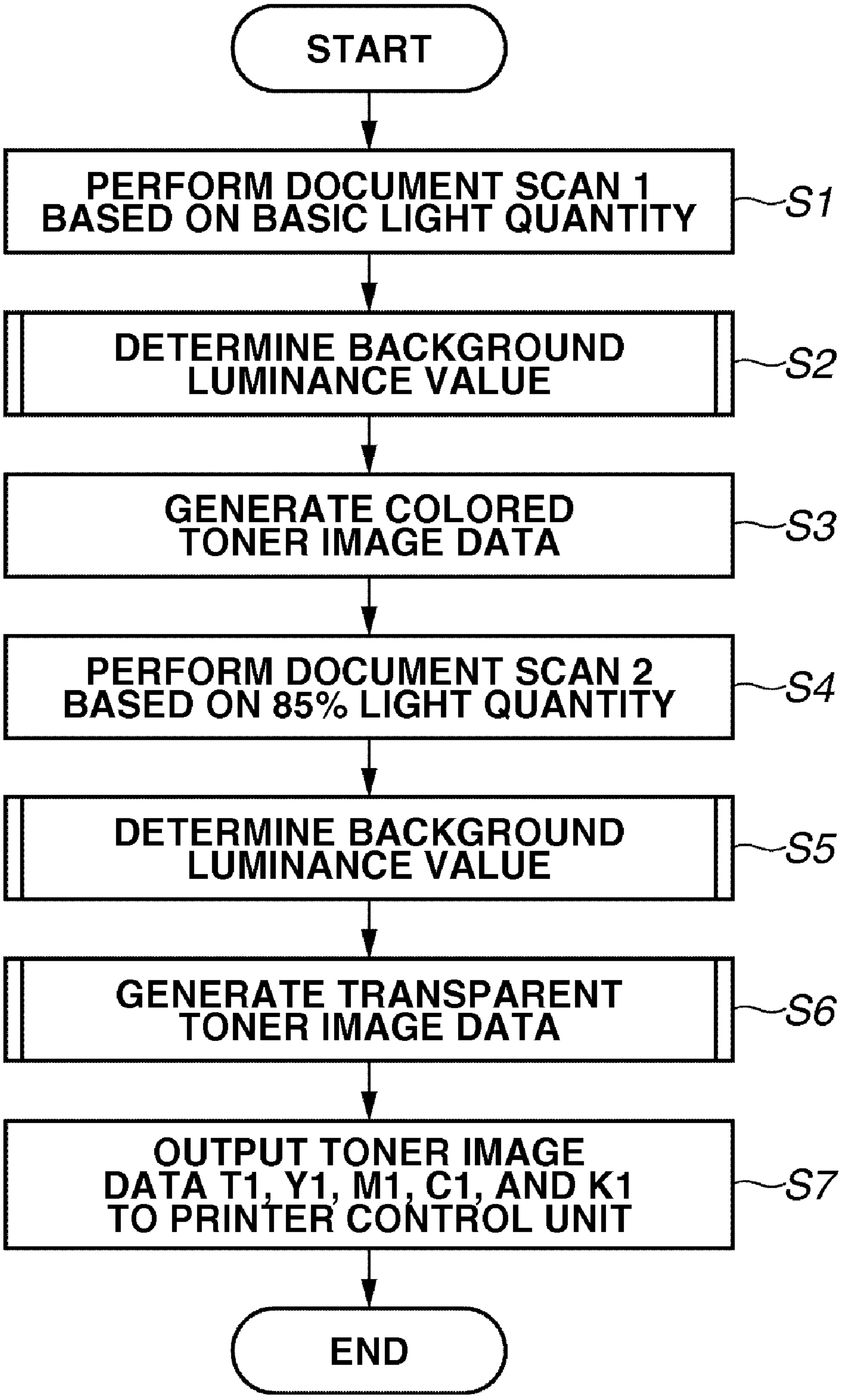
FIG. 9 is a flowchart illustrating an example of processing for forming an image of a highly glossy portion of a document with a transparent toner according to an exemplary embodiment of the present invention.

FIG. 9 is a flowchart illustrating an example of processing for reading a document including a highly glossy portion and forming an image of the highly glossy portion with a transparent toner, which can be executed by the CPU 214.

Figure 10:
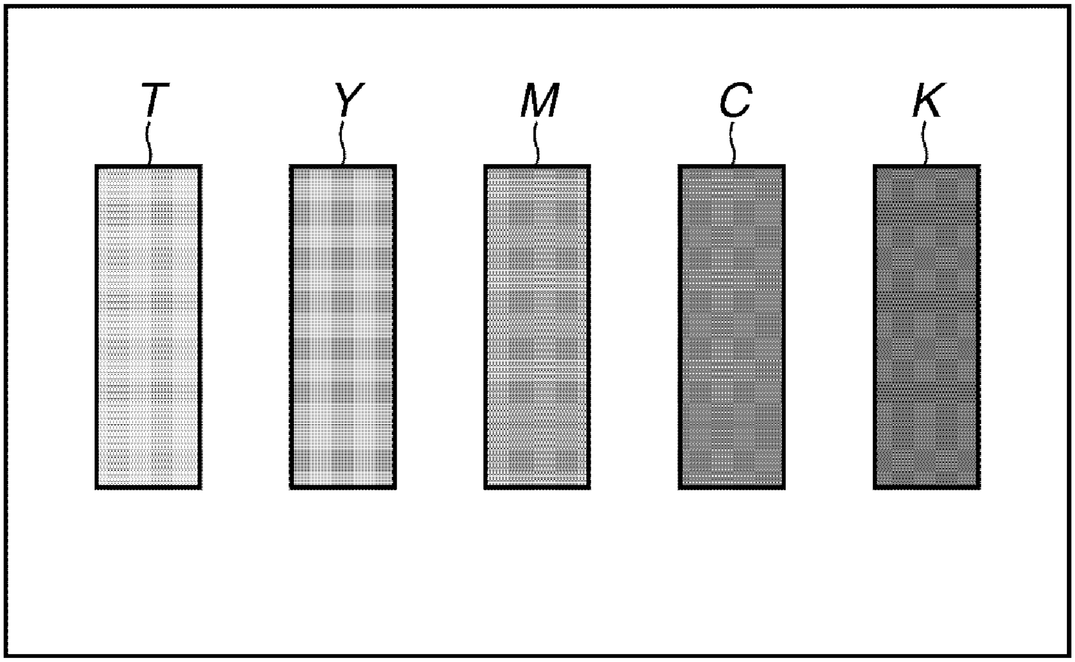
FIG. 10 illustrates an example of a document whose image is formed with a transparent toner and a colored toner.

In the following description, it is assumed that the document read by the image forming apparatus is a sheet on which belt-like images of the transparent toner (T) and various colored toners (Y, M, C, and K) are formed as illustrated in FIG. 10.

In step S1, the CPU 214 turns on the light source 103 that can emit a predetermined basic quantity of light (i.e., a first quantity of light) and causes the reader unit A to perform reading a document placed on the document positioning glass plate 102. The reading operation performed in step S1 can be referred to as "scan 1." The reader unit A can read colored images on the document through the scan 1. The reader unit A cannot distinguish transparent toner images from a document background because the transparent toner image and document background are converted into same digital image signal under the predetermined basic quantity of light.

Then, in step S2, the CPU 214 determines a document background luminance value based on the image data of the colored images having been read in the scan 1.

Figure 11:
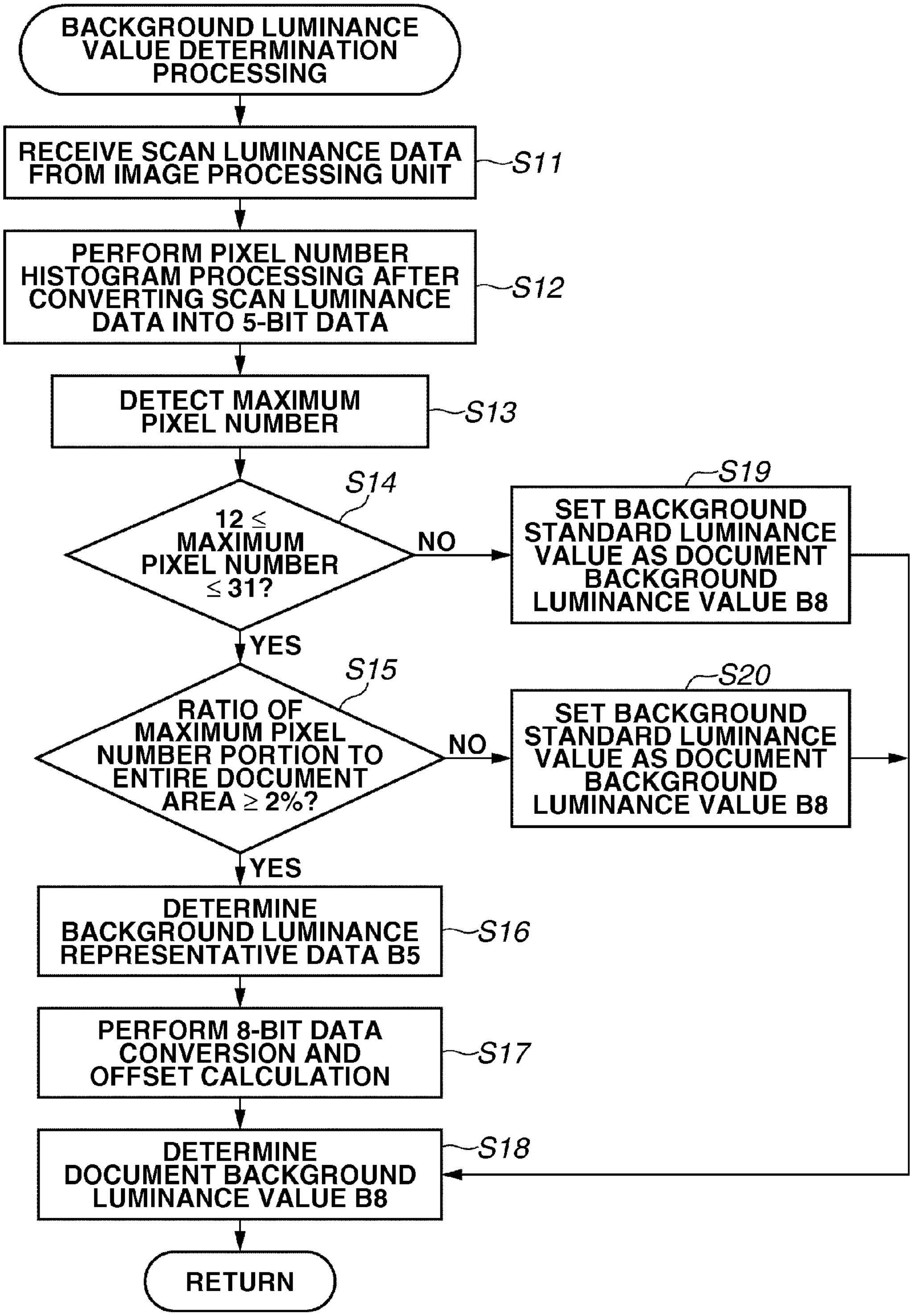
FIG. 11 is a flowchart illustrating details of the processing to be performed in step S2 illustrated in FIG. 9 for determining a document background luminance value based on image data of colored images according to an exemplary embodiment of the present invention.

FIG. 11 is a flowchart illustrating details of the processing to be performed in step S2 for determining the document background luminance value based on the image data of the colored images.

First, in step S11, the CPU 214 receives the image signal (i.e., luminance signal) G4 from the input masking circuit 205. The image signal G4 includes 8-bit luminance data, which can take a value in a range from 0 to 255.

Next, in step S12, the CPU 214 converts the 8-bit luminance data into 5-bit data, which can take a value in a range from 0 to 31. More specifically, the CPU 214 shifts the 8-bit luminance data rightward by an amount corresponding to three bits and selects lower 5-bit data. Then, the CPU 214 forms a histogram of the frequency of appearance (i.e., number of pixels) with respect to each value contained in apiece of image data.

Figure 12:
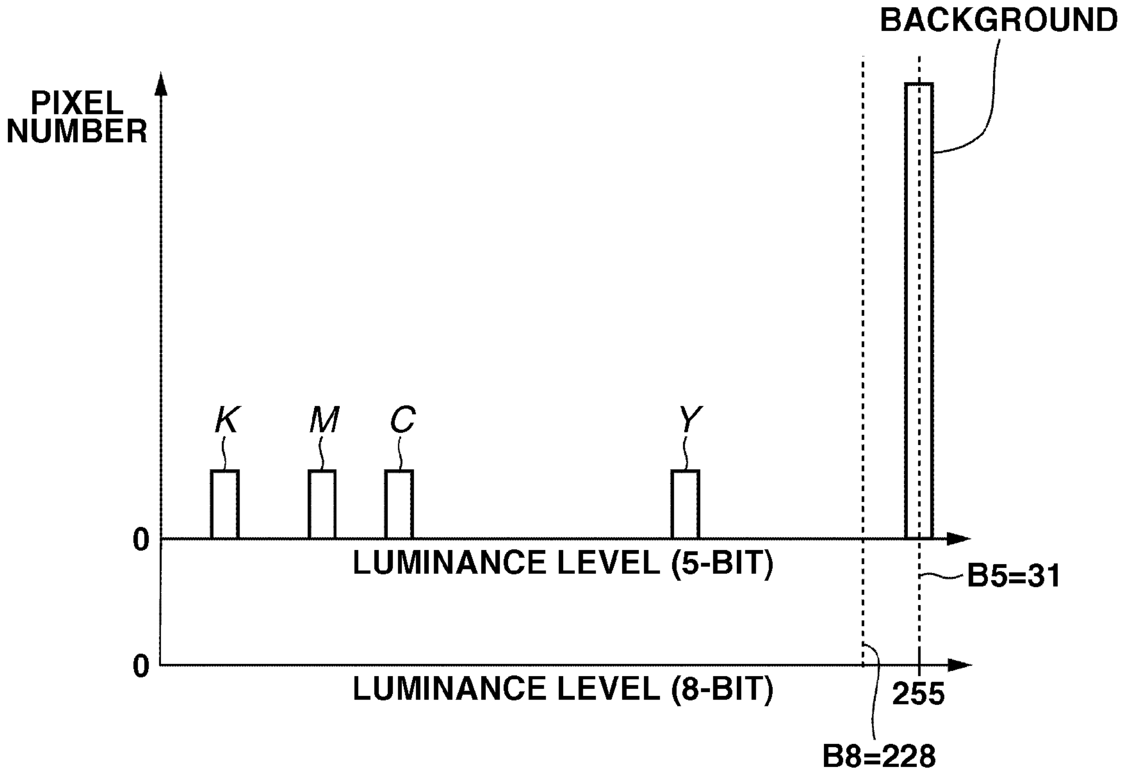
FIG. 12 illustrates an example of a histogram that can be generated in step S2 illustrated in FIG. 9.

The reason why the CPU 214 converts the 8-bit luminance data into the 5-bit data is because the CPU 214 needs not to process a great amount of data in the above-described formation of the histogram. For example, FIG. 12 illustrates an example of a histogram that can be obtained when the CPU 214 processes the document illustrated in FIG. 10.

In step S13, the CPU 214 detects a maximum value in the number of pixels referring to the histogram.

In step S14, the CPU 214 determines whether the maximum value in the number of pixels is within a range from 12 to 31. If it is determined that the maximum value in the number of pixels is less than 12 (NO in step S14), the CPU 214 determines that a maximum value portion (i.e., a portion corresponding to the maximum value in the number of pixels detected in step S13) is involved in the background because the luminance of the background is not so low. The processing proceeds to step S19.

In step S19, the CPU 214 sets a background standard luminance value, which is 8-bit data that can be set beforehand, as a document background luminance value B8. In the present exemplary embodiment, the background standard luminance value is set to 231. If it is determined that the maximum value in the number of pixels is within the range from 12 to 31 (YES in step S14), then in step S15, the CPU 214 obtains a ratio of the maximum value portion to the entire document area. Then, the CPU 214 determines whether the ratio of the maximum value portion to the entire document area is equal to or greater than 2%.

If it is determined that the ratio of the maximum value portion to the entire document area is less than 2% (NO in step S15), the CPU 214 determines that the maximum value portion is not involved in the background. Then, in step S20, the CPU 214 sets the predetermined background standard luminance value as the document background luminance value B8.

If it is determined that the ratio of the maximum value portion to the entire document area is equal to or greater than 2% (YES in step S15), the CPU 214 determines that the maximum value in the number of pixels is background data. Thus, in step S16, the CPU 214 determines the maximum value in the number of pixels as the background luminance representative data B5.

In step S17, the CPU 214 converts the background luminance representative data B5 into 8-bit data according to the following formula 1. The CPU 214 shifts the converted 8-bit data leftward by an amount corresponding to three bits. More specifically, the CPU 214 multiplies the background luminance representative data B5 by $2^3$ (=8) and subtracts an offset value "a" from the obtained value.

In step S18, the CPU 214 sets the value obtained in step S17 as the document background luminance value B8. After the CPU 214 determines the document background luminance value B8 in step S18, S19, or S20, the processing proceeds to step S3.

$$B8=B5\times 8-a \qquad \text{(formula 1)}$$

In the present exemplary embodiment, a reference value of the offset value "a" is set to 20. The reason why the formula 1 includes the offset value "a" is because the background of the document can be surely removed when a luminance value set as a threshold is lower than a peak value of the document background luminance by a predetermined luminance value.

For example, when the CPU 214 calculates the document background luminance value B8 for the document illustrated in FIG. 10, the background luminance representative data B5 is equal to 31 and the document background luminance value B8 is equal to 228 according to the formula (1). The offset value "a" can be arbitrarily changed by a user who can operate a setting screen to be displayed on the display device 218 of the operation unit 217.

After the CPU 214 completes the processing in step S2 (i.e., after the CPU 214 determines the document background luminance value B8), the processing proceeds to step S3. In step S3, the CPU 214 generates colored toner image data to be used for the image formation based on the image data having been read in step S1.

Figure 13:
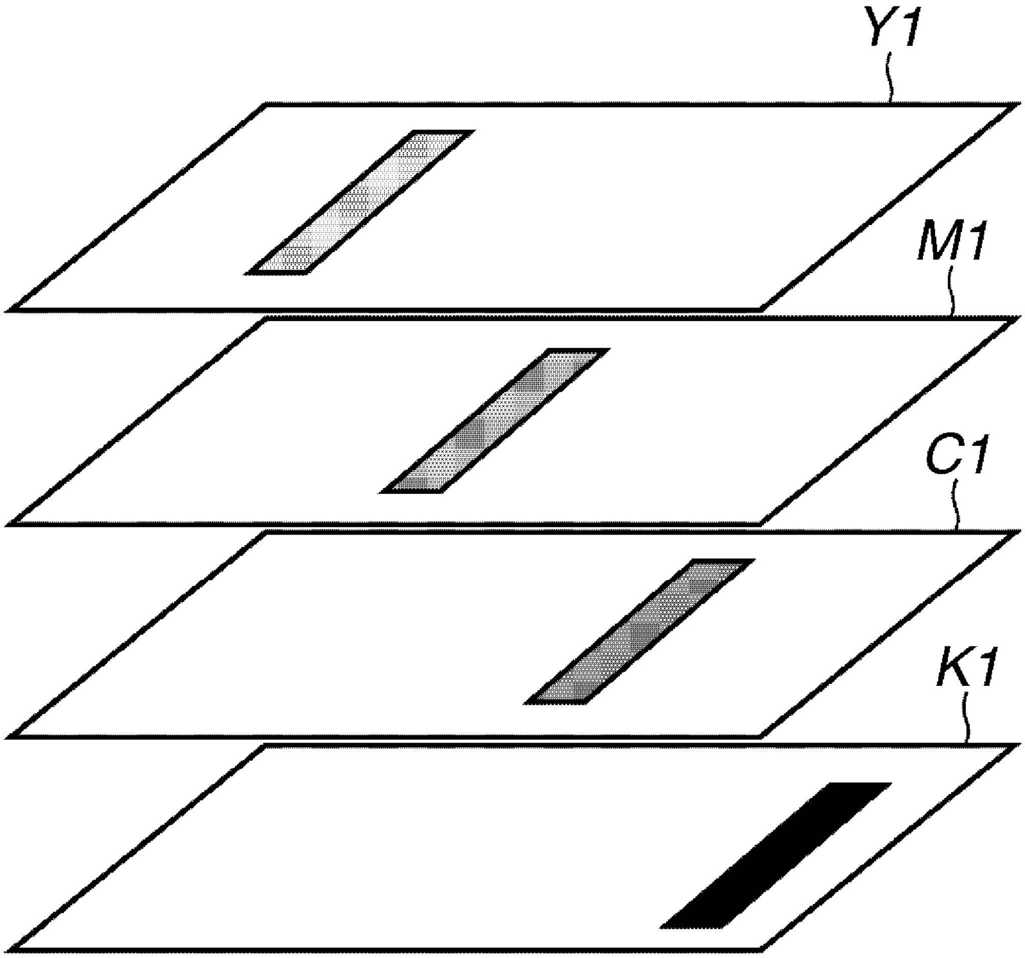
FIG. 13 illustrates an example of colored toner image data generated in step S3 illustrated in FIG. 9.

More specifically, in step S3, the CPU 214 performs conversion into Y, M, C, and K colored toner image data Y1, M1, C1, and K1, based on R, G, and B luminance data that are not involved in the background portion and not greater than the document background luminance value B8. For example, when the CPU 214 processes the document illustrated in FIG. 10, the CPU 214 generates the colored toner image data Y1, M1, C1, and K1 as illustrated in FIG. 13.

Next, in step S4, the CPU 214 causes the light source 103 to emit a reduced quantity of light (i.e., a second quantity of light), which is, for example, 85% of the basic quantity of light. Then, the CPU 214 causes the reader unit A to perform reading the document placed on the document positioning glass plate 102. The reading operation performed in step S4 can be referred to as "scan 2." The reader unit A can distinguish transparent toner images from a document background because irregular reflection light from the transparent toner image is darker than irregular reflection light from the document background, and the transparent toner image and document background are converted into different digital image signals under the reduced quantity of light.

When the light source 103 is adjusted to emit 85% of the basic quantity of light, the reader unit A can detect high glossy image portions (i.e., image portions formed with the transparent toner) from almost all of recording sheets available in the market. The reader unit A can read both high glossy images and colored images on the document through the scan 2. In step S5, the CPU 214 determines a document background luminance value based on the image data including the high glossy image having been read in the scan 2.

The CPU 214 can execute the background luminance value determination processing for the high glossy image (i.e., the above-described processing in step S5) according to the flowchart illustrated in FIG. 11. However, as described below, the offset value to be used in step S17 is different from the above-described value used in step S2.

Figure 14:
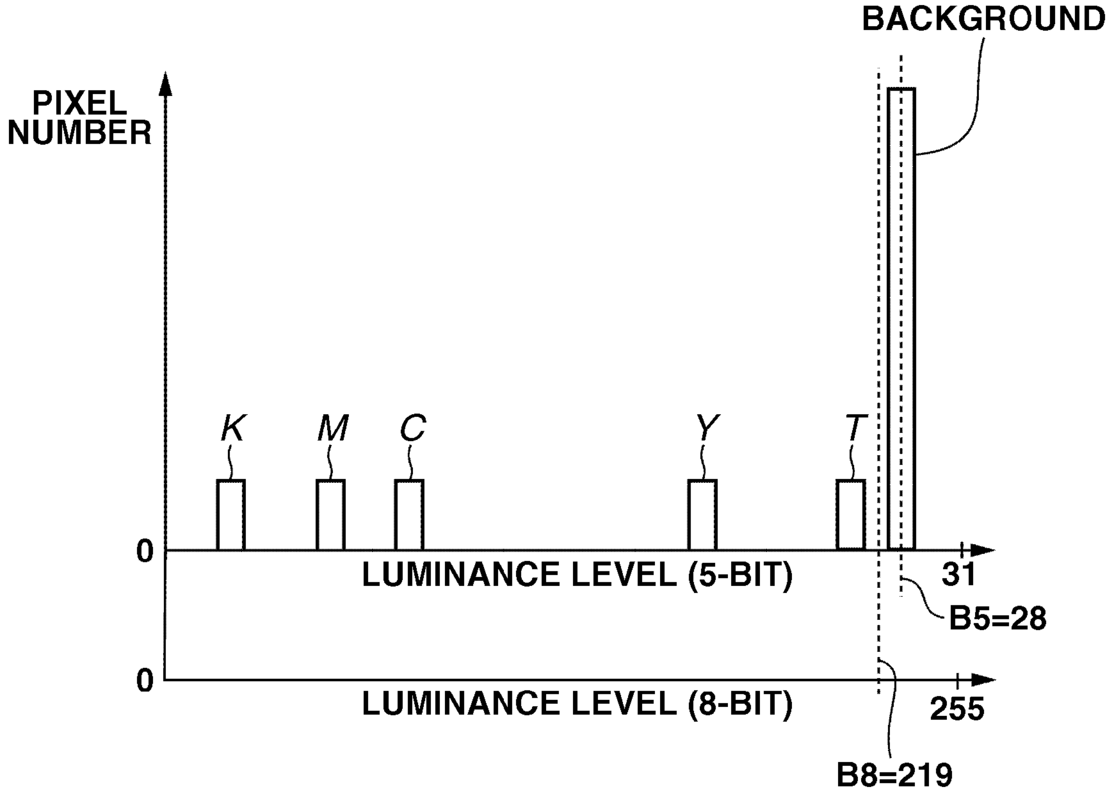
FIG. 14 illustrates an example of a histogram that can be generated in step S5 illustrated in FIG. 9.

The CPU 214 generates a histogram in step S12 as illustrated in FIG. 14 if the CPU 214 processes the document illustrated in FIG. 10. According to the histogram illustrated in FIG. 12, the high glossy image portion cannot be discriminated from the background portion. On the other hand, according to the histogram illustrated in FIG. 14, the highly glossy portion T can be discriminated from the background portion.

However, the luminance of the background portion is close to the luminance of the highly glossy portion. Therefore, when the CPU 214 calculates the document background luminance value B8 in step S17, the CPU 214 is required to perform offset calculation in such a way as to satisfy a relationship that the offset value is lower than the luminance value of the background portion and is higher than the luminance value of the highly glossy portion.

Accordingly, in step S17, the CPU 214 converts the background luminance representative data B5 into 8-bit data according to the following formula 2. Then, the CPU 214 subtracts an offset value "b" from the obtained value. The offset value "b" is smaller than the offset value "a." In the present exemplary embodiment, a reference value of the offset value "b" is set to 5. For example, when the CPU 214 calculates the document background luminance value B8 for the document illustrated in FIG. 10, the background luminance representative data B5 is equal to 28 and the document background luminance value B8 is equal to 219 according to the formula (2).

$$B8=B5\times 8-b \quad \text{(formula 2)}$$

Figure 15:
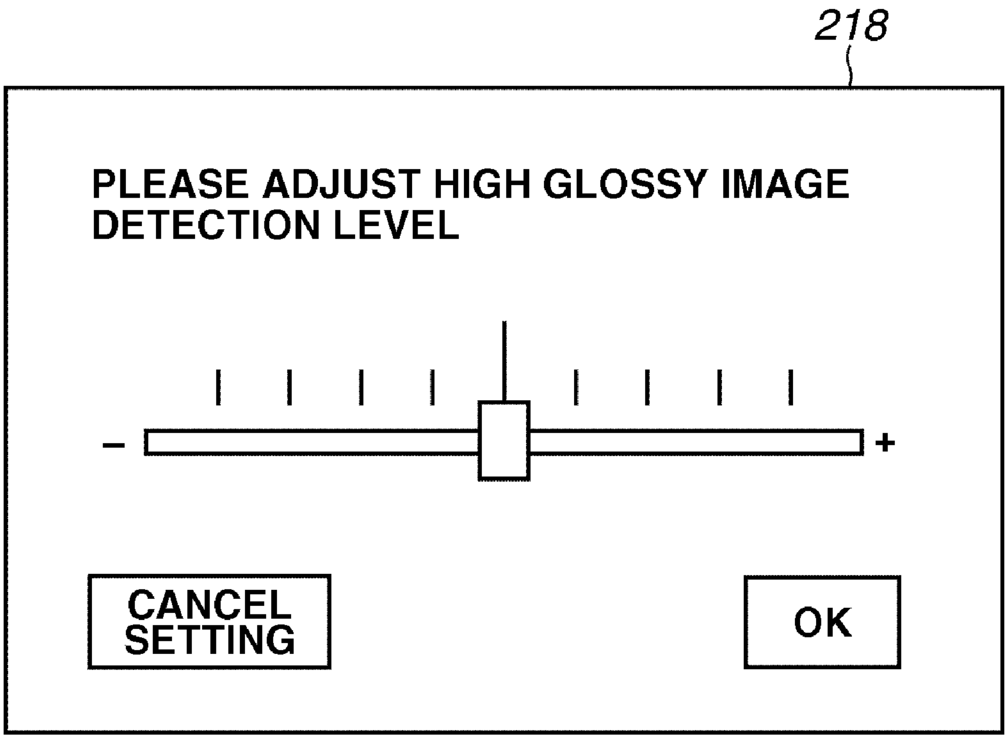
FIG. 15 illustrates an example of a setting screen that can be used to change a detection level of a high glossy image portion according to an exemplary embodiment of the present invention.

The offset value "b" can be arbitrarily changed by a user who can operate a setting screen (see FIG. 15) to be displayed on the display device 218 of the operation unit 217. For example, in a case where a special paper is used, the luminance value of a highly glossy portion may be excessively high or low. In such a case, the user can change a detection level of the high glossy image portion via the setting screen illustrated in FIG. 15. The setting screen illustrated in FIG. 15 provides four detection levels in each of plus (+) and minus (−) sides. The offset value "b" can be changed in increments of +2 in the plus (+) side. Similarly, the offset value "b" can be changed in increments of −2 in the minus (−) side.

After the CPU 214 completes the processing in step S5 (i.e., after the CPU 214 determines the document background luminance value B8), the processing proceeds to step S6. In step S6, the CPU 214 generates transparent toner image data based on the image data and the colored toner image data having been read in step S4.

Figure 16:
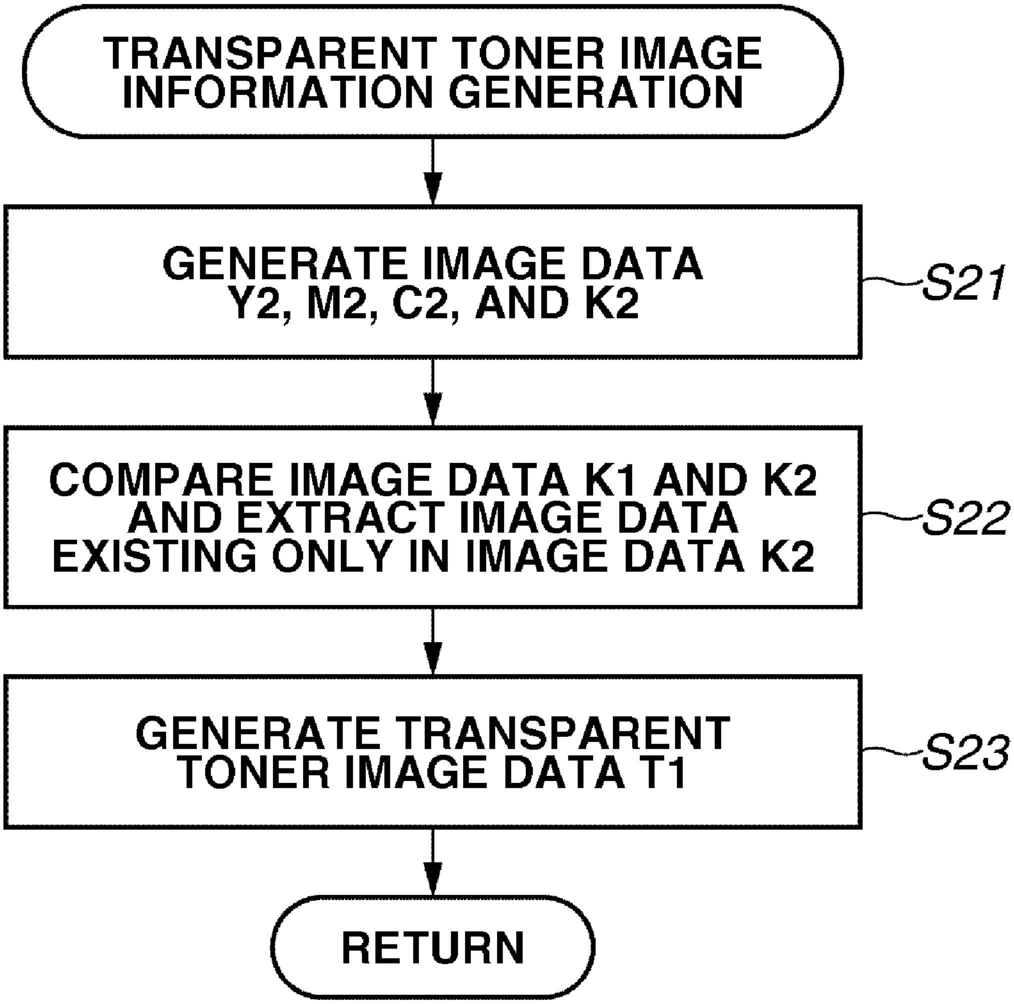
FIG. 16 is a flowchart illustrating details of the processing to be performed in step S6 illustrated in FIG. 9 for generating transparent toner image data according to an exemplary embodiment of the present invention.

FIG. 16 is a flowchart illustrating details of the processing to be performed in step S6 for generating the transparent toner image data.

Figure 17:
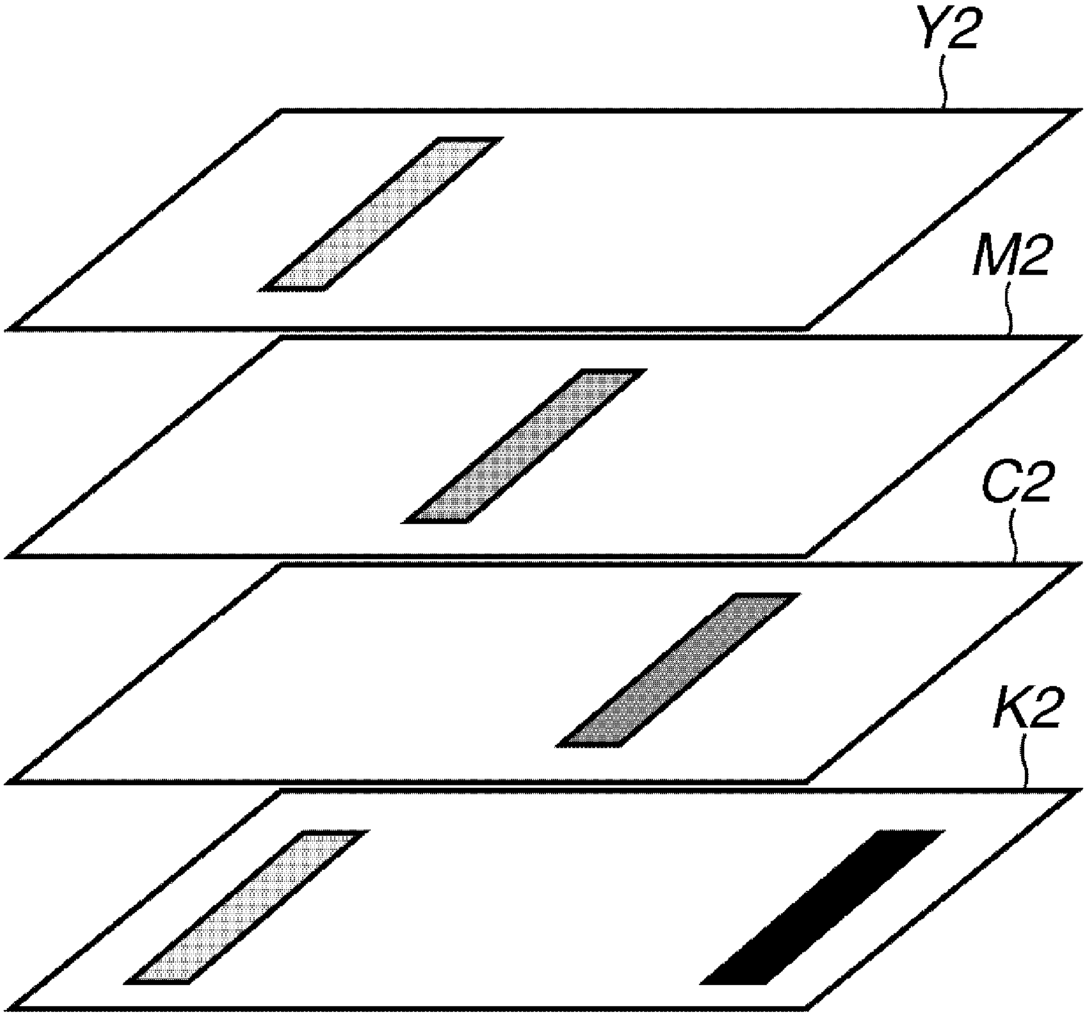
FIG. 17 illustrates an example of colored toner image data generated in step S21 illustrated in FIG. 16.

First, in step S21, the CPU 214 performs conversion into Y, M, C, and K colored toner image data Y2, M2, C2, and K2, based on R, G, and B luminance data that are not involved in the background portion and not greater than the document background luminance value B8. For example, when the CPU 214 processes the document illustrated in FIG. 10, the CPU 214 generates the colored toner image data Y2, M2, C2, and K2 as illustrated in FIG. 17.

Figure 18:
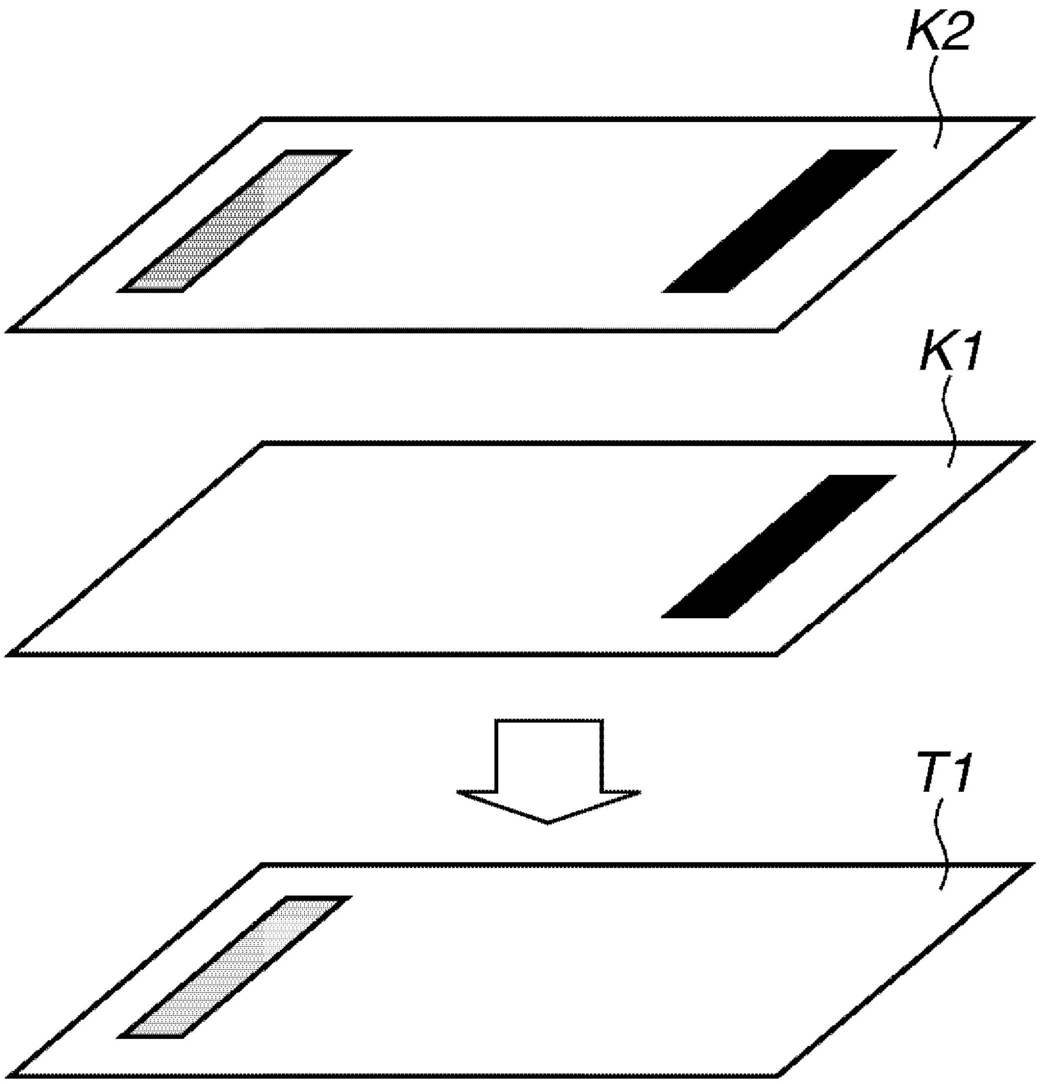
FIG. 18 illustrates an example of transparent toner image data extracted in step S22 illustrated in FIG. 16.

Next, in step S22, the CPU 214 compares the image data K1 (i.e., first black toner image data) with the image data K2 (i.e., second black toner image data) for each pixel. Then, the CPU 214 extracts image data that are present only in the image data K2. For example, when the CPU 214 processes the document illustrated in FIG. 10, the CPU 214 can obtain an extraction result illustrated in FIG. 18. The image constituted by pixels that are present only in the image data K2 is an image that was excluded as belonging to the background in the scan 1 and was not excluded in the scan 2.

As described above, the image constituted by pixels that are present only in the image data K2 can be regarded as an image including a large amount of regular reflection light component and a small amount of irregular reflection light component compared to other regions.

A sheet usable as a document is generally a white color sheet. Therefore, a gray image of a high-luminance region constituted by pixels existing only in the image data K2 can be regarded as an image of a highly glossy portion. Hence, the present exemplary embodiment regards the image constituted by pixels that are present only in the image data K2 as a high glossy image portion formed with a transparent toner.

When the CPU 214 extracts the image data constituted by the pixels that are present only in the image data K2 in step S22, the CPU 214 determines whether a target pixel is present only in the image data K2 based on not only a comparison result with respect to the target pixel itself but also a comparison result with respect to peripheral pixels surrounding the target pixel.

Figure 19:
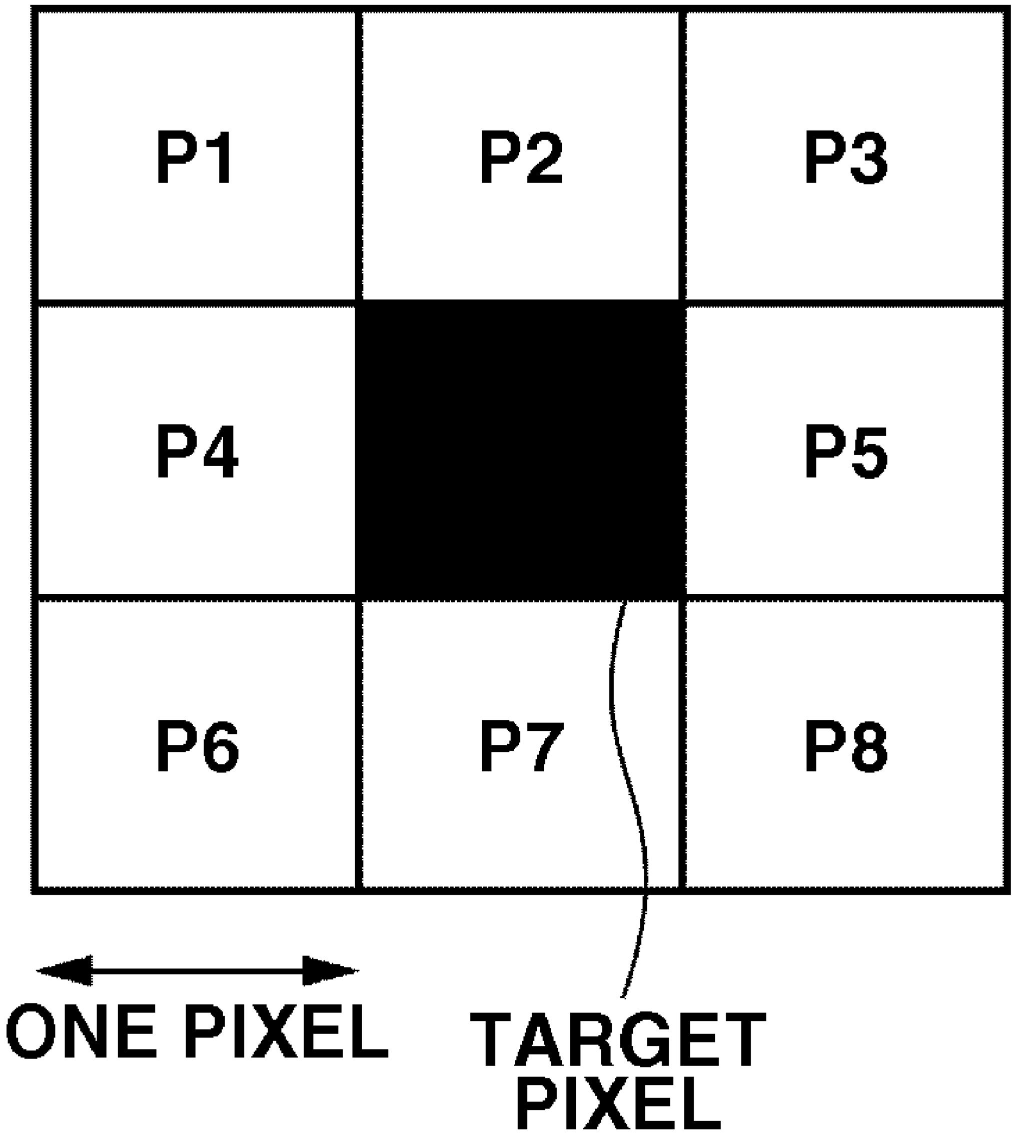
FIG. 19 illustrates an example of detailed extraction processing to be executed in step S22 illustrated in FIG. 16.

As illustrated in FIG. 19, in a case where at least two of eight peripheral pixels (i.e., p1 to p8) are present around a target pixel and extracted as existing only in the image data K2, the CPU 214 determines that the target pixel is a pixel of a transparent toner image.

In a case where at least two of the eight peripheral pixels (i.e., p1 to p8) are not present around the target pixel and extracted as existing only in the image data K2, the CPU 214 determines that the target pixel is not a pixel of the transparent toner image.

The reason why the CPU 214 performs the above-described determination is as follows. In general, if a background portion is a highlight region, luminance data of the background portion tends to include a relatively large amount of noise components that may be caused because of unevenness of a recording sheet surface or slight fluctuation of light emitted from a light source.

If the CPU 214 erroneously determines that the above-described noise components are pixels of a transparent toner, the image forming apparatus cannot accurately copy the transparent toner image. Hence, the CPU 214 performs the above-described determination considering a tendency that the high glossy image portion is present as an image pattern having an area greater than a predetermined level.

In step S23, the CPU 214 generates transparent toner image data T1 in such a way to set 70% for the pixel extracted as belonging to the high glossy image portion and set 0% for the other pixels. The reason why the present exemplary embodiment sets two values of 70% and 0% as the transparent toner image data is that human eyes cannot recognize any difference caused in transparent toner image portion when the transparent toner image portion is formed using a multi-value gradational expression. Thus, the present exemplary embodiment uses only two values for the purpose of expressing the presence/absence of a highly glossy portion.

However, the transparent toner image data can be set using a multi-value gradational expression. Further, the transparent toner image data for the highly glossy portion is not limited to 70% and can be set to any other appropriate percentage.

Figure 20:
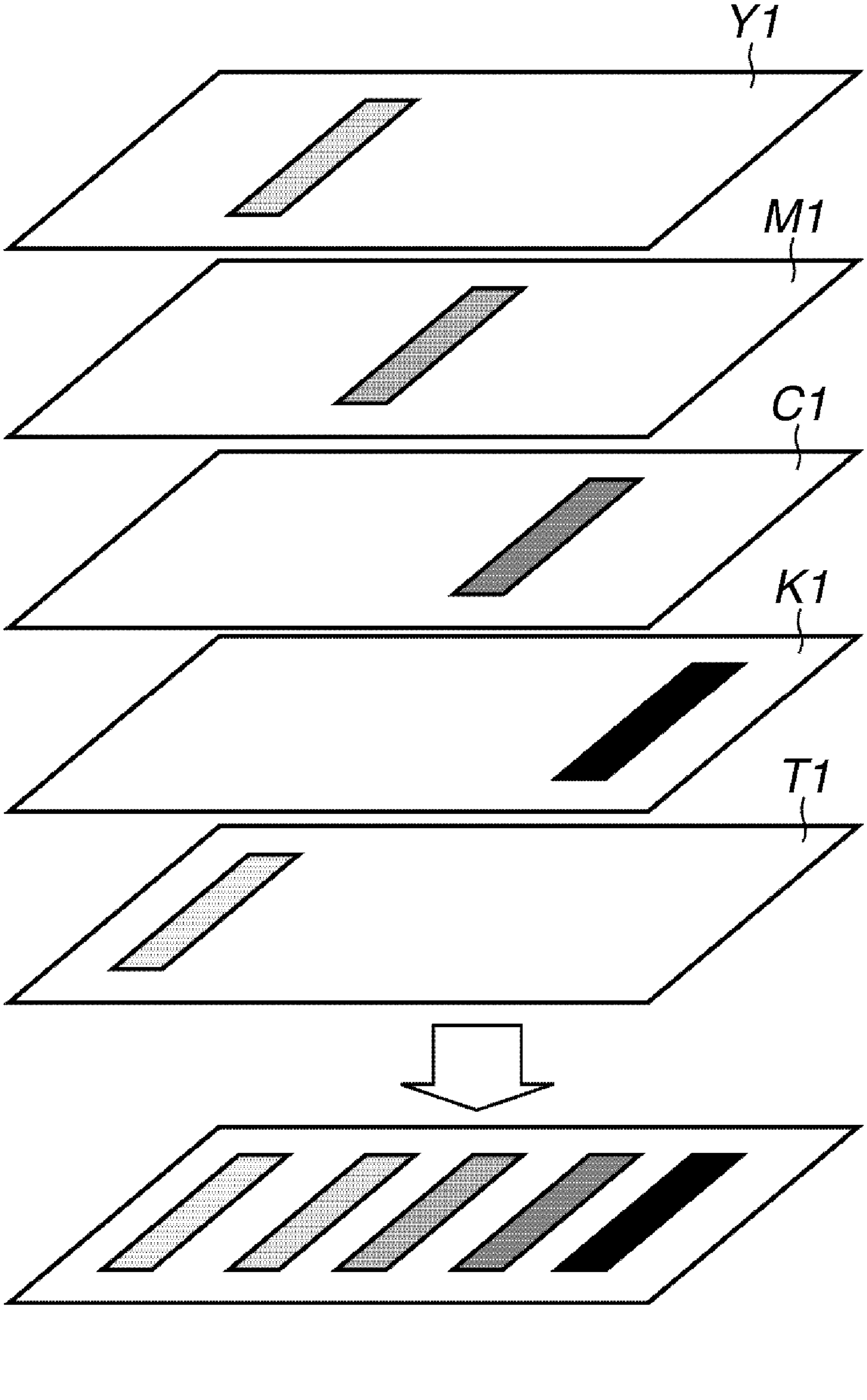
FIG. 20 illustrates an example of toner image data output in step S7 illustrated in FIG. 9.

In step S7, the CPU 214 outputs the toner image data T1, Y1, M1, C1, and K1 from the image processing unit 108 to the printer control unit 110. FIG. 20 illustrates examples of the toner image data T1, Y1, M1, C1, and K1 output from the CPU 214, for example, when the CPU 214 processes the document illustrated in FIG. 10. The printer control unit 110 controls the exposure devices 3*a* to 3*e* based on the above-described toner image data. Thus, the printer unit B can copy a high glossy image portion (i.e., a transparent toner image) of the document with the transparent toner and can copy a colored image portion (i.e., a colored toner image) of the document with the colored toner.

Figure 21:
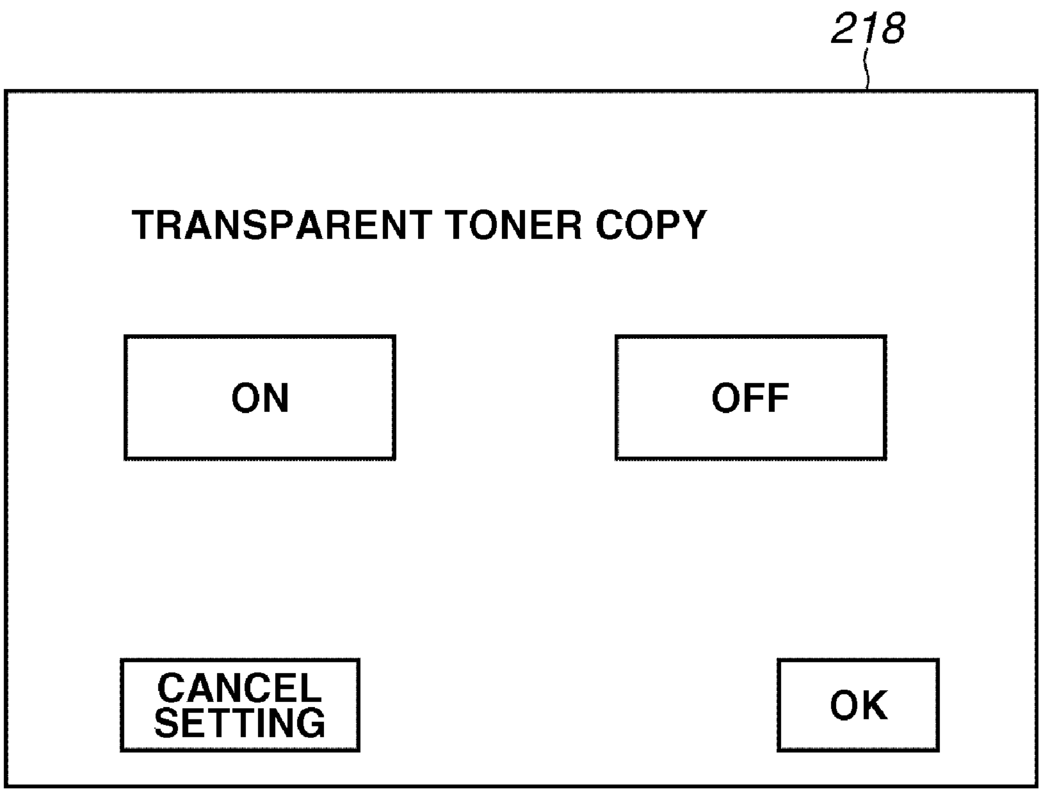
FIG. 21 illustrates an example of a setting screen that can be used to set a transparent toner copy mode for copying a high glossy image portion of a document with a transparent toner according to an exemplary embodiment of the present invention.

In the present exemplary embodiment, a setting screen illustrated in FIG. 21 can be displayed on the display device 218 of the operation unit 217. The setting screen illustrated in FIG. 21 allows a user to set a transparent toner copy mode for copying a high glossy image portion (i.e., a transparent toner portion) of a document with a transparent toner. For example, for the purpose of reducing running costs, it may be required to reduce a consumption amount of the transparent toner. In such a case, the user can set the transparent toner copy mode to OFF to prevent the printer unit B from outputting high glossy image portions.

Figure 22:
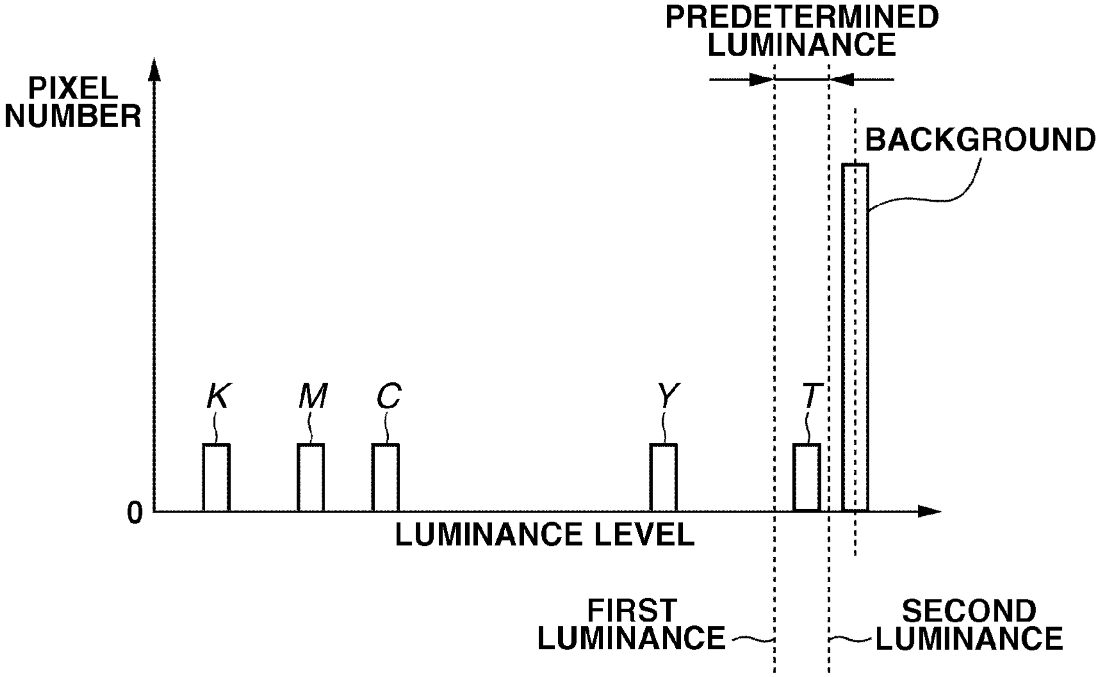
FIG. 22 illustrates an example of a histogram that can be generated in step S5 illustrated in FIG. 9.

The above-described exemplary embodiment removes only the background of a document referring to a luminance histogram of image data. However, as understood from a histogram illustrated in FIG. 22 (which is similar to FIG. 14), the image forming apparatus can identify a portion that can be expressed using image data having a predetermined luminance level, as a glossy portion.

More specifically, the image forming apparatus detects a portion that can be expressed using image data whose luminance is equal to or greater than a first luminance value and less than a second luminance value, which is not a maximum luminance value, as a glossy portion.

In this case, the image forming apparatus identifies a portion that can be expressed using image data whose luminance is equal to or greater than the second luminance value as a background of a document.

According to another exemplary embodiment, the luminance histogram can be replaced by a density histogram. In this case, the image forming apparatus identifies a portion that can be expressed using image data having a predetermined density as a glossy portion. More specifically, the image forming apparatus detects a portion that can be expressed using image data whose density is less than a first density value and equal to or greater than a second density value, which is not a minimum density value, as a glossy portion. In this case, the image forming apparatus identifies a portion that can be expressed using image data whose density is less than the second density value as a background of a document.

In the present exemplary embodiment, the image forming apparatus uses T, Y, M, C, and K toners for image formation. However, the image forming apparatus can use T, Y, M, C, K, light C, and light M toners to form an image.

Moreover, in the above-described exemplary embodiment, the image forming apparatus can form an image of a detected high glossy image portion with a transparent toner. However, if an image forming apparatus does not include any unit capable of forming an image with a transparent toner, the image forming apparatus can form an image of a detected high glossy image portion with a colored toner that is different from the transparent toner.

According to the above-described modified embodiment, when the image forming apparatus copies a document including an image formed using only the transparent toner in a background of a document, the image forming apparatus can output a product in such a manner that a transparent toner image portion of a document can be visually recognized. When the image forming apparatus forms an image of the transparent toner image portion of the document with the colored toner, it is desired that the formed image has a low density. It is desired that the amount of a toner to be used for forming an image of the transparent toner image portion of the document is approximately 10% (not 70%).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-272130, filed Oct. 22, 2008, which is hereby incorporated by reference herein in its entirety.

What is claimed is:

1. A copying apparatus comprising:

a reading unit configured to read an image of a document;

an illumination unit configured to illuminate the document;

a generating unit configured to generate first image data that does not include a background component of the document, based on image data output from the reading unit that has read the document in a state where the illumination unit emits a first quantity of light, and generate second image data that does not include the background component of the document, based on image data output from the reading unit that has read the document in a state where the illumination unit emits a second quantity of light that is smaller than the first quantity of light;

a detection unit configured to detect a transparent toner image based on the first image data and the second image data; and an image forming unit configured to form, on a sheet, a colored image with a colored toner based on the first image data, and the detected transparent toner image with a transparent toner.

2. The copying apparatus according to claim 1, further comprising an illumination unit configured to illuminate the document, wherein the reading unit is configured to read the image of the document based on irregular reflection light received from the document illuminated by the illumination unit.

3. The copying apparatus according to claim 1, further comprising a histogram forming unit configured to form a histogram of luminance or density based on the image data output from the reading unit, wherein the background component is determined based on the histogram generated by the histogram forming unit.

4. The copying apparatus according to claim 1, further comprising a setting unit configured to set a transparent toner copy mode for copying with the transparent toner, wherein the image forming unit is configured to form the image on the sheet with the transparent toner when the transparent toner copy mode is set by the setting unit.

5. The copying apparatus according to claim 1, wherein the detecting unit detects the transparent toner image that is not present in the first image data and is present in the second image data, and wherein the colored toner is yellow, magenta, cyan and black toners.

* * * * *